No. 770,647. PATENTED SEPT. 20, 1904.
S. MEEKER.
SCRAPER.
APPLICATION FILED APR. 13, 1904.
NO MODEL.

Witnesses
John W. Wheeler.

Inventor
Susanna Meeker.
By R. H. A. Macey, Attorneys

No. 770,647. Patented September 20, 1904.

UNITED STATES PATENT OFFICE.

SUSANNA MEEKER, OF FRANKLIN, OHIO.

SCRAPER.

SPECIFICATION forming part of Letters Patent No. 770,647, dated September 20, 1904.

Application filed April 13, 1904. Serial No. 203,000. (No model.)

*To all whom it may concern:*

Be it known that I, SUSANNA MEEKER, a citizen of the United States, residing at Franklin, in the county of Warren and State of Ohio, have invented certain new and useful Improvements in Scrapers, of which the following is a specification.

The object of my invention is to provide a very serviceable and at the same time inexpensive scraper device for use in cleaning pots, kettles, or the like.

The scraper comprising my invention consists, essentially, of a hollow round body specially adapted to scrape the sides of the receptacles being cleaned, a handle formed with said body, and a scraping-point projected from the body, the latter forming a part of an extension which is carried by the handle. The extension with which the scraping-point is formed is particularly advantageous in that it aids in obtaining a firm grasp upon the device in the manipulation thereof.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1:
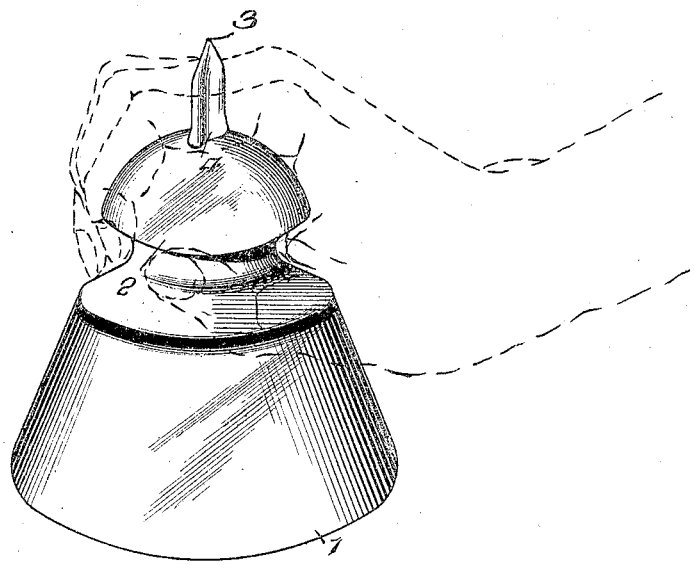
Figure 2:
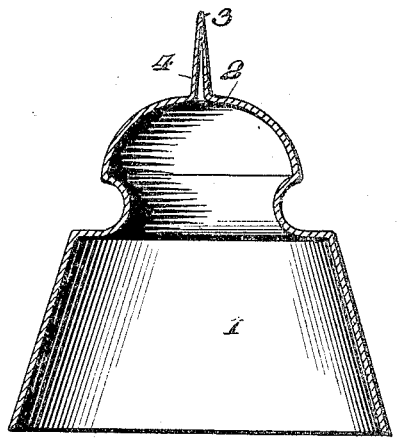

Figure 1 is a perspective view showing the embodiment of the invention. Fig. 2 is a vertical sectional view through the scraper.

Corresponding and like parts are referred to in the following description and indicated in all the views of the drawings by the same reference characters.

The body 1 of the scraper is preferably of frusto-conical form, as shown most clearly in Fig. 2, so as to facilitate the scraping action thereof against the sides of the article being scraped or cleaned. The body 1 is hollow and of round form, being open at its lower portion and provided at its upper portion with the handle 2, which is firmly held in the hand in the actual use of the device. It is designed that the handle 2 be integrally formed with the body 1, and this handle is of somewhat ball form, having its sides diverged from the point of juncture thereof with the body 1. The bulbous form of the handle 2 is such that the same may be readily gripped within the palm of the hand, so as to be firmly held in moving the scraper along the sides of a receptacle or the like. The handle 2 is narrowed adjacent the point where the same joins or merges into the body 1, so that the fingers of the operator of the device are protected in the use thereof, the special form of the sides of the body 1 being also advantageous for the above reason. The body 1 and the handle 2, which are integral with each other, are preferably made of sheet metal pressed into the requisite form in order that the device may be constructed as cheaply as possible.

As is readily apparent, the scraper-body 1 is not adapted for use in scraping out corners of pans or similar receptacles, and for this reason I provide as a part of my device a scraping-point 3, the latter being provided at the upper end of an extension 4, which is projected from the handle 2. It is preferred that the extension 4 be disposed about centrally of the handle, though it will be understood that the same may be located adjacent the sides thereof if found desirable. The extension 4 is preferably of flat form and not only serves in the capacity of a supporting member for the scraping-point, but when the handle 2 is gripped by the hand, this extension being received between the fingers, admits of a firmer hold upon the scraper in the manipulation of the device. The extension being of flat form prevents turning of the scraper after the same has been grasped, as will be readily seen. When the scraping-point 3 is being used, the body 1 of the device is grasped in the hand.

The hollow form of the device makes the same comparatively light, and the whole article embodies a comparatively cheap tool very serviceable for the purposes hereinbefore described. It being preferred that the whole device be stamped from a single piece of sheet metal, the extension 4 is pressed outward as an integral portion of the blank from which the article is made. The extension will be noted as of hollow form in view of the foregoing.

Having thus described the invention, what is claimed as new is—

As an article of manufacture, a scraping device consisting of a hollow sheet-metal body of frusto-conical form having a bulbous handle pressed upwardly from the upper portion centrally thereof, and narrowed or reduced at the point of jointure with the scraper and a flat hollow extension pressed upwardly from the central portion of the handle and formed at its upper end with a scraper-point.

In testimony whereof I affix my signature in presence of two witnesses.

SUSANNA MEEKER.

Witnesses:
R. C. ADAMS,
RALPH B. PARKS.